United States Patent
Davis et al.

(10) Patent No.: US 11,640,075 B2
(45) Date of Patent: May 2, 2023

(54) ELECTRO-OPTIC MODULATOR UTILIZING COPPER-TUNGSTEN ELECTRODES FOR IMPROVED THERMAL STABILITY

(71) Applicant: II-VI Delaware, Inc., Wilmington, DE (US)

(72) Inventors: Ryan Davis, Natrona Heights, PA (US); Wen-Qing Xu, Sarver, PA (US); Elgin Eissler, Renfrew, PA (US); Fred Kropf, Cranberry Township, PA (US)

(73) Assignee: II-VI Delaware, Inc., Wilmington, DE (US)

( * ) Notice: Subject to any disclaimer, the term of this patent is extended or adjusted under 35 U.S.C. 154(b) by 300 days.

(21) Appl. No.: 17/016,947

(22) Filed: Sep. 10, 2020

(65) Prior Publication Data
US 2022/0075214 A1   Mar. 10, 2022

(51) Int. Cl.
*G02F 1/03*   (2006.01)
*G02F 1/01*   (2006.01)

(52) U.S. Cl.
CPC .......... *G02F 1/0316* (2013.01); *G02F 1/0136* (2013.01); *G02F 2202/101* (2013.01); *G02F 2202/106* (2013.01)

(58) Field of Classification Search
CPC .................................................... G02F 1/0316
See application file for complete search history.

(56) References Cited

U.S. PATENT DOCUMENTS

| | | | |
|---|---|---|---|
| 4,788,627 A * | 11/1988 | Ehlert | H01L 24/29 174/16.3 |
| 5,600,480 A | 2/1997 | Chien et al. | |
| 6,067,134 A * | 5/2000 | Akiyama | G02F 1/1347 349/139 |
| 7,099,069 B2 | 8/2006 | Zappettini et al. | |
| 7,280,569 B2 | 10/2007 | Laughman et al. | |
| 8,470,388 B1 | 6/2013 | Zsinko et al. | |
| 9,575,340 B2 | 2/2017 | Eissler et al. | |
| 2008/0002751 A1 | 1/2008 | Hua et al. | |
| 2015/0221812 A1 | 8/2015 | Reese et al. | |
| 2016/0246080 A1* | 8/2016 | Eissler | G02F 1/03 |

FOREIGN PATENT DOCUMENTS

| | | | | |
|---|---|---|---|---|
| CN | 106908970 | * | 6/2017 | ................. G02F 1/11 |
| CN | WO-2020133000 | * | 2/2020 | ............. H03H 9/125 |

* cited by examiner

*Primary Examiner* — Sang V Nguyen
(74) *Attorney, Agent, or Firm* — Wendy W. Koba

(57) ABSTRACT

A high-power electro-optic modulator (EOM) is formed to use specialized electrodes of a material selected to have a CTE that matches the CTE of the modulator's crystal. Providing CTE matching reduces the presence of stress-induced birefringence, which is known to cause unwanted modulation of the propagating optical signal. The specialized electrodes are preferably formed of a CuW metal matrix composite having a W/Cu ratio selected to create the matching CTE value. Advantageously, the CuW-based electrodes also exhibit a thermal conductivity about an order of magnitude greater than conventional electrode material (brass, Kovar) and thus provide additional thermal stability to the EOM's performance.

8 Claims, 3 Drawing Sheets

ELECTRO-OPTIC MODULATOR UTILIZING COPPER-TUNGSTEN ELECTRODES FOR IMPROVED THERMAL STABILITY

TECHNICAL FIELD

The present invention relates to high power electro-optic modulators and, more particularly, to the utilization of electrodes specifically formed to exhibit a coefficient of thermal expansion (CTE) to match the CTE of the modulator's crystal material.

BACKGROUND OF THE INVENTION

An electro-optic modulator (EOM) is a device in which an electrical signal can be imposed on an optical carrier. This electrical signal may be imposed on the phase, frequency, amplitude, or polarization of the optical carrier, depending on the orientation of the included electro-optic active material (crystal) and the system in which in the modulator is used. The imposed electrical signal functions to modify the refractive index of the electro-optic active material, which in turn modifies (i.e., "modulates) the optical carrier passing through the crystal. A polarization modulator may be configured as a voltage-controlled shutter capable of switching a laser source at rates of kHz-MHz with rise/fall times on the order of nanoseconds. EOMs used in such a configuration are susceptible to degradation of performance due to thermal effects, including undesired leaking of light via stress birefringence, pointing shift, and thermal lensing.

One approach to address the thermal issues related to high power EOMs is to maintain the modulator package itself at a stable temperature, such as by the utilization of water cooling. Water cooling, however, introduces additional complexities to the package design and obviously requires extra facilities at the modulator installation site.

SUMMARY OF THE INVENTION

The needs remaining in the prior art are addressed by the present invention, which relates to the utilization of specialized electrodes particularly formed to exhibit a coefficient of thermal expansion (CTE) that essentially matches the CTE of the modulator's crystal material.

In accordance with the principles of the present invention, a thermally-stable EOM is provided by utilizing specialized copper-tungsten (CuW) metal matrix composite electrodes formed to have a specific W/Cu ratio such that the CTE of the electrodes substantially matches the CTE of the active crystal material. This is in contrast to prior art configurations that utilize electrodes formed of either brass or a nickel-cobalt ferrous alloy (sold under the tradename of "Kovar"), neither material particularly well-suited in terms of matching CTE.

It is an aspect of the present invention that utilizing electrodes having a CTE that is matched to the active crystal material significantly reduces (indeed, substantially eliminates) unwanted stress-related birefringence in the crystal as the modulator temperature fluctuates, since any expansion/contraction of the electrodes as a function of temperature will be essentially the same as those experienced by the crystal. Minimizing this stress-based birefringence minimizes leakage of light across the crystal, maintaining consistent switching behavior based solely upon the voltage-induced birefringence related to the electrical modulating signal.

Moreover, CuW metal matrix composite electrodes advantageously exhibit a higher thermal conductivity than conventional electrodes formed of materials such as Kovar or brass. As a result, the use of CuW metal matrix composite electrodes in accordance with the principles of the present invention allows for the heat generated within the crystal to be quickly transported away and thus reduce temperature-induced changes in crystal behavior (e.g., pointing shift, thermal lensing).

The combination of reduced thermal stress and improved thermal conductivity yields an electro-optic modulator that is able to operation over a wide temperature range with consistent results.

The CuW metal matrix composite electrodes may be mechanically clamped to the crystal, or bonded to the crystal using specific thin films that further improve thermal conductivity. The bonding may take the form of a cold weld bond or a soldered bond. Indeed, one possible configuration may utilize one electrode that is mechanically clamped to the crystal and one electrode that is bonded to the crystal.

The active crystal material, generally speaking, is defined as a single crystal material whose crystal structure lack inversion symmetry, and exhibits electro-optic effects. Examples of such single crystal materials useful in a modulator of the present invention include, but are not limited to, the following: CdTe, CdZnTe, ZnTe, and GaAs. In accordance with the principles of the present invention, the specific formulation of the W/Cu ratio in the metal matrix composite is created so that the CTE of the electrodes essentially matches that of material selected for use as the crystal.

An exemplary embodiment of the present invention may take the form of an electro-optic modulator comprising a single crystal element that exhibits changes in internal birefringence in response to an applied voltage (the single crystal element having opposing major surfaces and exhibiting a material-specific coefficient of thermal expansion (CTE)) The electro-optic modulator also includes a pair of electrodes formed of a CuW metal matrix composite and coupled to the opposing major surfaces of the single crystal element. In accordance with the principles of the present invention, the electrodes are formed to have a W/Cu ratio such that the CTE of the CuW metal matrix composite electrodes essentially matches the CTE of the single crystal element.

Other and further aspects and advantages of the present invention will become apparent during the course of the following discussion and by reference to the accompanying drawings.

BRIEF DESCRIPTION OF THE DRAWINGS

Referring now to the drawings.

DETAILED DESCRIPTION

Reference throughout this specification to an "example" or an "embodiment" means that a particular feature, structure, or characteristic described in connection with the example is included in at least one embodiment of the invention. Thus appearances of the terms "example" or "embodiment" in various places throughout the specification do not necessarily refer to the same embodiment. Furthermore, as used herein, the terms "about", "substantially" and "essentially" means that the recited characteristic (e.g., "CTE") need not be achieved exactly, but that deviations or variations, including for example, tolerances, measurement error, measurement accuracy limitations and the like as known to those skilled in the art, may occur in amounts that do not preclude the effect that the recited characteristic was intended to provide.

Figure 1:
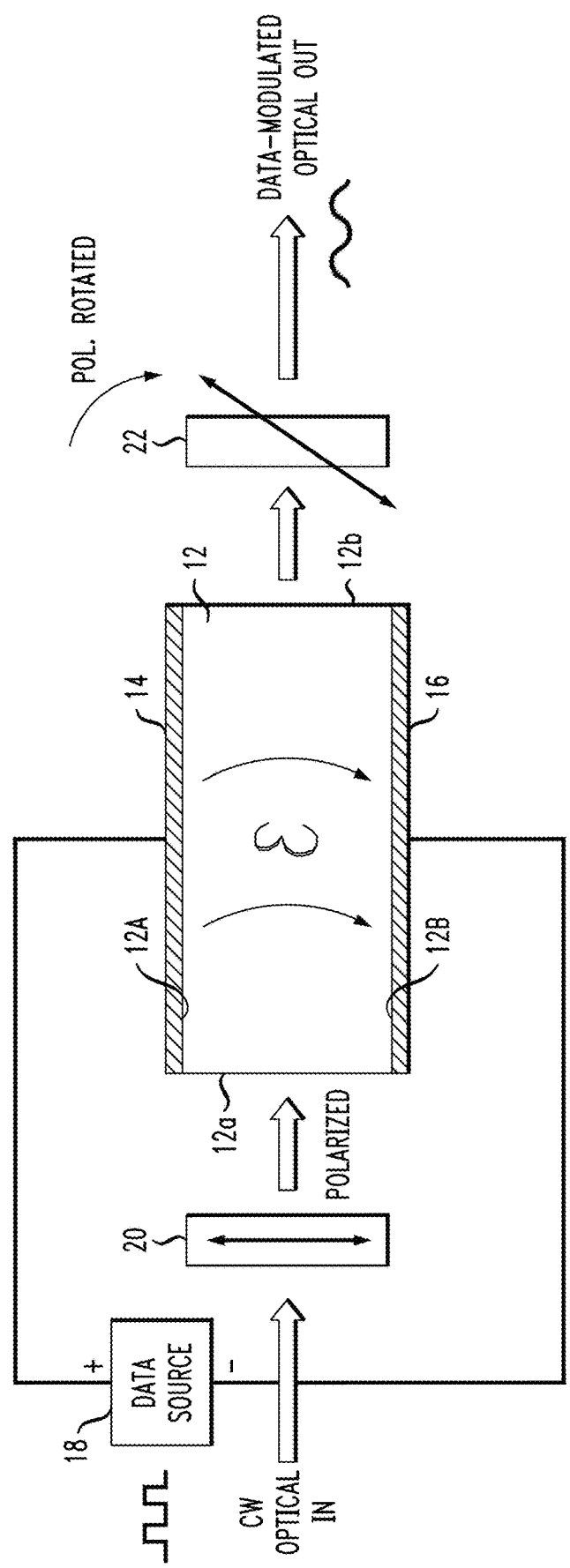
FIG. 1 is a simplified block diagram of an exemplary electro-optic modulator formed in accordance with the principles of the present invention.

FIG. 1 illustrates an exemplary electro-optic modulator 10 formed in accordance with the present invention. The operation of electro-optic modulator 10 is based upon the ability to "modulate" the birefringence of an active single crystal component 12 by the application of an electric field potential ε across the crystal. A pair of electrodes 14, 16 is disposed to contact opposing major surfaces 12A, 12B of crystal component 12. As also shown, electrodes 14, 16 are coupled to an external electrical signal source 18 (i.e., a data signal for modulating the birefringence so as to impress the data signal on an optical carrier). When the electric field is present, an internal birefringence is created and causes a rotation of the polarization direction of crystal component 12. As a result of this polarization rotation, an optical signal propagating through crystal component 12 undergoes a polarization transformation as it progresses from an input endface 12a to an output endface 12b of crystal component 12.

In the particular configuration of FIG. 1, crystal component 12 is positioned between a first polarizing element 20 and a second polarizing element 22, where the polarization state of second element 22 is rotated 90° with respect to first element 20 (in some cases, second polarizing element 22 is referred to as an "analyzer").

An input optical carrier beam initially passes through first polarizing element 20 so that a beam of a "known" polarization state is created. The polarized beam then passes through crystal 12 and is rotated through a predetermined polarization angle proportional to the electric field ε created by the presence of a voltage across electrodes 14, 16. The amplitude of the modulated optical signal exiting second polarizing element 22 will thus be a function of the electric field applied to crystal 12 (i.e., indicative of the orientation between the polarized input signal and the electric field-induced polarization state of the crystal).

The arrangement of FIG. 1 thus functions as a voltage-controlled shutter, capable of switching a laser at rates of kHz-MHz, with rise/fall times on the order of nanoseconds. However, the generation of heat within crystal 12 is known to be problematic, allowing for additional, unwanted modulation of the propagating optical signal to occur. Indeed, one source of temperature increase within crystal 12 is the propagation of the optical carrier beam itself, which necessarily results in the absorption of optical energy within the crystalline material, thus elevating its temperature.

One undesirable effect of the increase in crystal temperature is "thermal lensing", which is a known effect where those regions of the crystal that experience a larger change in temperature exhibit a greater change in refractive index. The presence of a temperature gradient across the crystal results in forming a refractive index gradient that adversely impacts the optical beam propagating through the crystal. Moreover, the presence of elevated temperatures is likely to introduce unwanted stress-induced birefringence within the crystal, due to a CTE mismatch between the crystal and conventional materials used to form the electrodes.

Therefore, in accordance with the principles of the present invention, electrodes 14, 16 are formed of a specialized material having a CTE that is particularly designed to match the CTE of crystal component 12. The specialized material preferably comprises a CuW metal matrix structure, with the ratio of W to Cu controlled to provide CTE matching ("matching" in this case defined as substantially the same value, within limits as mentioned above).

By matching CTE, the possibility of temperature-related, unwanted stress-induced birefringence within crystal 12 (related to strain-stress at the interface between crystal 12 and electrodes 14, 16) is significantly reduced, if not substantially eliminated. As a result, the change in birefringence experienced by crystal 12 will be controlled solely by the application (and the switching) of the voltage across electrodes 14, 16, stabilizing the modulator performance in high power, high temperature operating conditions.

Moreover, it has been found that CuW exhibits a thermal conductivity on the order of magnitude greater than that of conventional electrode materials (e.g., brass, Kovar). This relatively high thermal conductivity of CuW (greater than 100 W/mK, as compared to the 17 W/mK thermal conductivity of Kovar) improves the cooling of the modulator crystal, reducing pointing shift and thermal lensing. Indeed, the use of specialized CuW metal matrix composite electrodes in accordance with the principles of the present invention allows high-power EOMs to operate in a less-exotic environment than water-cooled arrangements. It is to be understood, however, that the inventive CTE-matched electrode/crystal configuration of the present invention may still be used in a water-cooled modulator installation.

Figure 2:
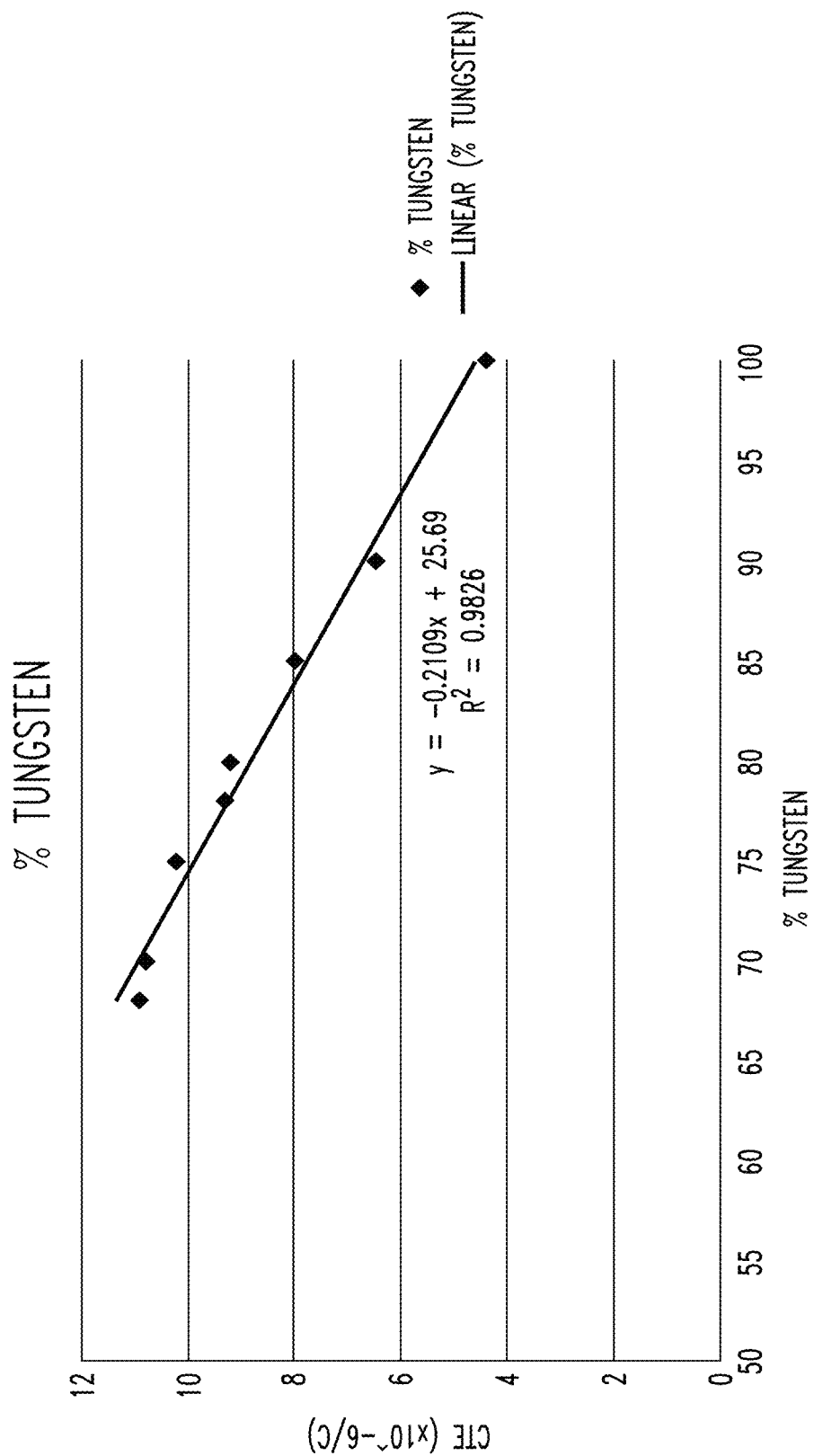
FIG. 2 is a graph showing CTE as a function of % W in a CuW metal matrix composite material.

In embodiments where the single crystal material selected for use is CdTe (having a CTE of $5.9*10^{-6}$/K), CuW metal matrix composite electrodes formed to have a W/Cu ratio of 93/7 will exhibit essentially this same CTE. In high-power EOM embodiments using GaAs crystals (having a CTE of $5.6*10^{-6}$/K), using a W/Cu ratio of 95/5 yields a CuW metal matrix composite electrode with this same CTE value. FIG. 2 is graph illustrating the CTE of CuW as a function of the percentage of W in the metal matrix structure, which may therefore be used in determine a specific W/Cu ratio best suited for a particular crystal material. Since Cu and W are not mutually soluble, the electrode material is composed of finely dispersed copper and tungsten phases. In one form, a selected volume of molten Cu is used to infiltrate the W matrix to yield a final product have the desired, specialized W/Cu ratio required for CTE matching with the modulator's crystal component.

Figure 3:
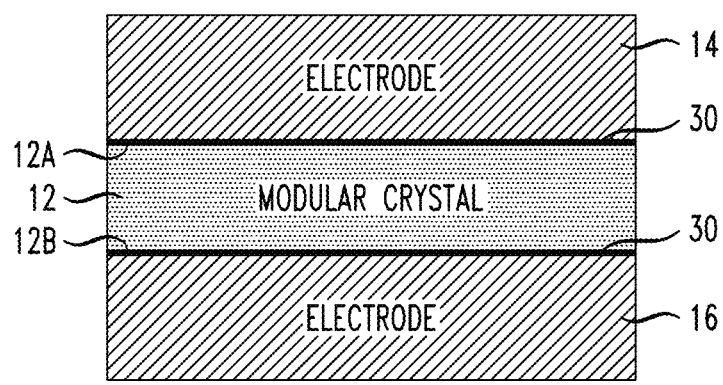
FIG. 3 shows one embodiment of a combination of an exemplary crystal and pair of specialized electrodes, with the electrodes physically bonded to opposing major surfaces of the crystal.

As mentioned above, there are a variety of different configurations that may be used to couple the specialized CuW metal matrix electrodes to the electro-optic crystal material in order to form a thermally-stable EOM in accordance with the principles of the present invention. FIG. 3 illustrates one exemplary arrangement where electrodes 14, 16 are directly bonded to crystal 12 by a thin layer 30 of an electrically- and thermally-conductive adhesive. The adhesive is applied to the opposing major surfaces 12A, 12B of crystal 12 to form thin layers 30, and electrodes 14, 16 are then brought into contact with the adhesive. In other embodiments, appropriate metal films may be applied to both the exposed major surfaces of crystal 12 and the mating surfaces of electrodes 14, 16. The metal film is used to create either a cold weld bond or a soldered bond (depending on the composition of the metal film).

Figure 4:
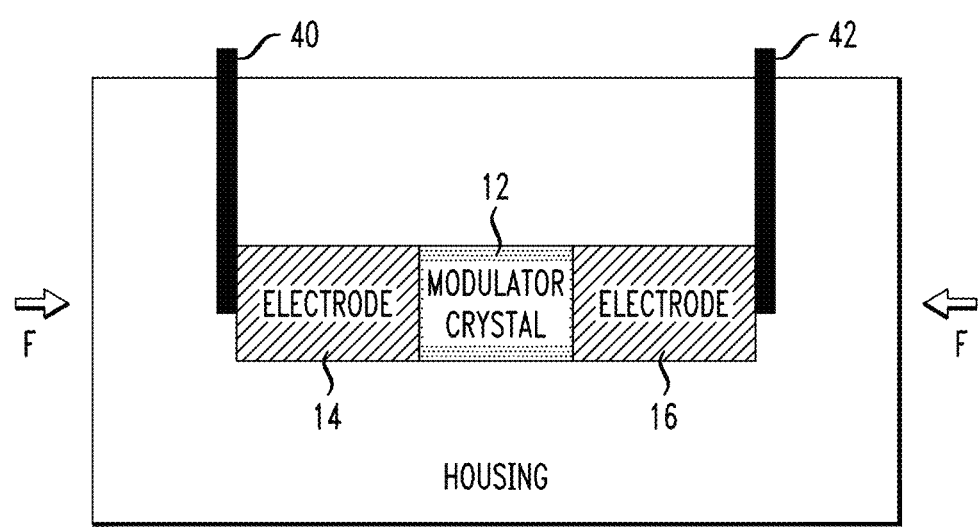
FIG. 4 shows another embodiment of this combination, where the specialized electrodes are mechanically attached to (i.e., "clamped" to) the opposing major surfaces of the crystal.

FIG. 4 illustrates another possible arrangement for coupling electrodes 14, 16 to crystal 12. Here, crystal 12 is mechanically clamped between electrodes 14, 16. A pair of clamps 40, 42 is shown in FIG. 4, where the directional arrows depict the mechanical force (F) used to hold clamps 40, 42 in place against electrodes 14 and 16, respectively. The clamping also creates the necessary electrical signal path (i.e., creating the electric field across crystal 12). While not explicitly shown, it is also possible to utilize an arrangement where one electrode is physically attached (bonded) to crystal 12 (as depicted in FIG. 3) and the other electrode is held in place mechanically against the surface of crystal 12 (as depicted in FIG. 4).

It will be clear to those skilled in the art that various modifications and adaptations can be made to the present invention without departing from the spirit and scope thereof. Accordingly, the inventive scope is not to be limited by the specific embodiments described herein. Rather, scope of the invention is to be defined by the following claims and their equivalents.

What is claimed is:

1. An electro-optic modulator comprising
a single crystal element that exhibits changes in internal birefringence in response to an applied voltage, the single crystal element having opposing major surfaces and exhibiting a material-specific coefficient of thermal expansion (CTE); and
electrodes formed of a CuW metal matrix composite and coupled to the opposing major surfaces of the single crystal element, a W/Cu ratio of the CuW metal matrix composite selected to create electrodes having a CTE that substantially matches the CTE of the single crystal element.

2. The electro-optic modulator as defined in claim 1 wherein the electrodes are mechanically clamped to the opposing major surfaces of the single crystal element.

3. The electro-optic modulator as defined in claim 1 wherein the electrodes are bonded to the opposing major surfaces of the single crystal element.

4. The electro-optic modulator as defined in claim 3 wherein a thin adhesive film is disposed between the opposing major surfaces of the single crystal element and the electrodes.

5. The electro-optic modulator as defined in claim 3 wherein a thin metal film is disposed between the opposing major surfaces of single crystal element and the electrodes.

6. The electro-optic modulator as defined in claim 1 wherein single crystal element is selected from the group consisting of: CdTe, CdZnTe, ZnTe, and GaAs.

7. The electro-optic modulator as defined in claim 6 wherein the single crystal element comprises CdTe, having a material-based CTE of $5.9*10^{-6}$/K, and the W/Cu ratio is selected to be 93/7 to form CTE-matched electrodes of CuW metal matrix composite material.

8. The electro-optic modulator as defined in claim 6 wherein the single crystal element comprises GaAs, having a material-based CTE of $5.6*10^{-6}$/K, and the W/Cu ratio is selected to be 95/5 to form CTE-matched electrodes of CuW metal matrix composite material.

* * * * *